(12) United States Patent
Utsumi et al.

(10) Patent No.: US 10,291,084 B2
(45) Date of Patent: May 14, 2019

(54) STATOR AND MANUFACTURING METHOD THEREFOR

(71) Applicant: NIDEC SANKYO CORPORATION, Nagano (JP)

(72) Inventors: Shinichi Utsumi, Nagano (JP); Hiroki Kuratani, Nagano (JP); Yuji Maruyama, Nagano (JP); Hideo Shimodaira, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 122 days.

(21) Appl. No.: 15/415,866

(22) Filed: Jan. 26, 2017

(65) Prior Publication Data
US 2017/0222500 A1 Aug. 3, 2017

(30) Foreign Application Priority Data

Jan. 28, 2016 (JP) ................. 2016-013902

(51) Int. Cl.
*H02K 3/18* (2006.01)
*H02K 1/14* (2006.01)
(Continued)

(52) U.S. Cl.
CPC ........... *H02K 1/148* (2013.01); *F04D 13/064* (2013.01); *H02K 3/18* (2013.01); *H02K 5/128* (2013.01);
(Continued)

(58) Field of Classification Search
CPC ................. H02K 1/148; H02K 3/18
See application file for complete search history.

(56) References Cited

U.S. PATENT DOCUMENTS 6,856,064 B2 * 2/2005 Masumoto ........... H02K 15/024
310/216.008
7,777,387 B2 * 8/2010 Nagai ................. H02K 15/022
29/596
(Continued)

FOREIGN PATENT DOCUMENTS

CN 201616715 10/2010
CN 103812236 5/2014
(Continued)

OTHER PUBLICATIONS

"Search Report of Europe Counterpart Application", dated Jun. 8, 2017, p. 1-p. 9.
(Continued)

*Primary Examiner* — Dang D Le
(74) *Attorney, Agent, or Firm* — JCIPRNET

(57) ABSTRACT

A stator including a stator core formed in a ring shape is manufactured as follows; previously preparing an original core body provided with a belt-shaped part in a straight line shape structured of multiple outer peripheral parts and multiple salient pole parts, forming a recessed part on each of outer side faces of first outer peripheral parts disposed on both end sides of the belt-shaped part at a position between the salient pole part connected with the first outer peripheral part and an end part in the longitudinal direction of the belt-shaped part; and a bending step in which the original core body is successively pressed and bent from a center of the belt-shaped part toward both end sides.

9 Claims, 9 Drawing Sheets

(51) Int. Cl.
*H02K 15/02* (2006.01)
*H02K 5/128* (2006.01)
*F04D 13/06* (2006.01)
H02K 15/095 (2006.01)
F04D 1/00 (2006.01)

(52) U.S. Cl.
CPC ............ *H02K 15/022* (2013.01); *F04D 1/00* (2013.01); *H02K 15/095* (2013.01)

(56) References Cited

U.S. PATENT DOCUMENTS

| | | | |
|---|---|---|---|
| 7,986,064 B2 * | 7/2011 | Katagiri ................. | H02K 1/148 310/216.008 |
| 9,059,611 B2 * | 6/2015 | Li .......................... | H02K 1/148 |
| 2003/0222531 A1 | 12/2003 | Akutsu et al. | |

FOREIGN PATENT DOCUMENTS

| | | |
|---|---|---|
| CN | 206498263 | 9/2017 |
| JP | 2010057211 | 3/2010 |

OTHER PUBLICATIONS

"Office Action of China Counterpart Application," dated Aug. 16, 2018, with English translation thereof, pp. 1-20.

* cited by examiner

STATOR AND MANUFACTURING METHOD THEREFOR

CROSS REFERENCE TO RELATED APPLICATION

The present invention claims priority under 35 U.S.C. § 119 to Japanese Application No. 2016-013902 filed Jan. 28, 2016, the entire content of which is incorporated herein by reference.

FIELD OF THE INVENTION

At least an embodiment of the present invention may relate to a stator which is used in a motor or the like. Further, at least an embodiment of the present invention may relate to a manufacturing method for the stator.

BACKGROUND

Conventionally, a motor has been known which includes a rotor and a stator in a cylindrical tube shape which is disposed on an outer peripheral side of the rotor (see, for example, Japanese Patent Laid-Open No. 2010-57211). In the motor described in the Patent Literature, a stator includes a stator core and a drive coil which is wound around a teeth part of a stator core through an insulator. The stator core is formed by combining a plurality of split cores which are divided in a circumferential direction of the stator. The split core is provided with an outer side yoke part connected with an outer side end of a tooth part in a radial direction of the stator. Further, the Patent Literature describes that the stator core may also utilize a so-called curling core which is structured so that a belt-shaped core in which outer side yoke parts are connected with each other is bent in a circular ring shape and its end parts are connected with each other.

The curling core is, for example, as shown in FIG. 7, formed by using an original core body 105 provided with a belt-shaped portion 103 in a straight line shape, which is structured of a plurality of outer side yoke parts 102 connected with each other through connecting parts 101, and teeth parts (salient pole parts) 104 which are protruded in a direction perpendicular to a longitudinal direction of the belt-shaped portion 103 from each of the plurality of the outer side yoke parts 102. Further, the curling core is structured by successively bending the belt-shaped portion 103 at the connecting parts 101, for example, in the order shown in FIGS. 8A through 8C and by connecting both ends of the belt-shaped portion 103 with each other so that the belt-shaped portion 103 is set in a circular ring shape and that the salient pole parts 104 are protruded to an inner side in a radial direction.

In the motor described in the Patent Literature, a tip end face of the salient pole part 104 (inner side face in a radial direction of the stator) is formed in a curved face shape which is a circular arc shape when viewed in an axial direction of the stator. The tip end faces of the salient pole parts 104 are disposed in a design on an imaginary circle "VC10" with the axial center "C10" of the stator as a center when viewed in the axial direction of the stator so that air gaps (gap space in a radial direction between a rotor and the stator) are constant in a circumferential direction of the stator.

In a case that the belt-shaped portion 103 is successively bent in the order shown in FIGS. 8A through 8C, the connecting part 101 which is first bent from a state shown in FIG. 7 to a state shown in FIG. 8A is also acted with a force in a bending direction when the belt-shaped portion 103 is secondly bent from the state shown in FIG. 8A to a state shown in FIG. 8B and, even when the belt-shaped portion 103 is thirdly bent from the state shown in FIG. 8B to a state shown in FIG. 8C. In other words, a force in a bending direction is acted two times on the first bent connecting part 101 after having been bent.

Further, the connecting parts 101 which are secondly bent are also acted with a force in a bending direction when the belt-shaped portion 103 is thirdly bent from the state shown in FIG. 8B to the state shown in FIG. 8C. In other words, a force in a bending direction is acted once on the second bent connecting parts 101 after having been bent. On the other hand, the connecting parts 101 which are bent thirdly are not acted with a force in a bending direction after having been bent.

According to examinations of the present inventors, the present inventors have found that, for example, in a case that the number of the salient pole parts 104 is small like a case that the number of the salient pole parts 104 is six, when the belt-shaped portion 103 is successively bent as shown in FIGS. 8A through 8C, tip end faces of the salient pole parts 104A connected with two outer side yoke parts 102A disposed at both ends of the belt-shaped portion 103 in the original core body 105 are largely displaced from the imaginary circle "VC10" when viewed in the axial direction of the stator.

In other words, the present inventors have found that, in a case that the number of the salient pole parts 104 is small, when the belt-shaped portion 103 is successively bent as shown n FIGS. 8A through 8C, the circularity of a circle formed by the tip end faces of six salient pole parts 104 is deteriorated by the salient pole parts 104A when viewed in the axial direction of the stator. Specifically, the present inventors have found that, as shown in FIG. 9 which is an enlarged view of the "G" part in FIG. 8C, when viewed in the axial direction of the stator, the tip end faces of the salient pole parts 104A are largely displaced to an outer side in the radial direction from the imaginary circle "VC10" and the circularity of a circle formed by the tip end faces of six salient pole parts 104 is deteriorated by the salient pole parts 104A.

SUMMARY

In view of the problem described above, at least an embodiment of the present invention may advantageously provide a stator including a stator core, which is a curling core, capable of restraining deterioration of circularity of a circle which is formed by tip end faces of a plurality of salient pole parts when viewed in an axial direction of the stator even when the number of the salient pole parts of the stator core is relatively small. Further, at least an embodiment of the present invention may advantageously provide a manufacturing method for the stator.

According to at least an embodiment of the present invention, there may be provided a stator formed in a tube shape including a coil, an insulation member, and a stator core provided with a plurality of salient pole parts around each of which the coil is wound through the insulation member. The stator core is provided with an outer peripheral ring part formed in a ring shape and the plurality of the salient pole parts which are protruded from the outer peripheral ring part toward an inner side in a radial direction of the stator and are disposed at a constant interval in a circumferential direction of the stator. The outer peripheral ring part is structured of outer peripheral parts having the same number as the plurality of the salient pole parts, and the outer peripheral parts are arranged in the circumferential direction and a center in the circumferential direction of each of the outer peripheral parts is connected with the salient pole part. A joint is formed at one position of boundaries in the circumferential direction of the outer peripheral parts, remaining positions of the boundaries in the circumferential direction of the outer peripheral parts except the joint are formed with connecting parts which connect outer side ends in the radial direction of the outer peripheral parts with each other and, when the outer peripheral parts disposed on both sides of the joint are referred to as first outer peripheral parts, an outer side face in the radial direction of the first outer peripheral part is formed with a recessed part which is recessed toward an inner side in the radial direction, and the recessed part is formed between the salient pole part connected with in the first outer peripheral part and the joint in the circumferential direction.

In the stator in accordance with at least an embodiment of the present invention, an outer peripheral ring part is structured of a plurality of outer peripheral parts arranged in a circumferential direction of the stator, and a joint is formed at one position of boundaries of the outer peripheral parts in the circumferential direction. Further, in at least an embodiment of the present invention, a recessed part which is recessed toward an inner side in a radial direction is formed on outer side faces in the radial direction of the first outer peripheral parts disposed on both sides of the joint, and the recessed part is formed between the salient pole part connected with the first outer peripheral part and the joint in the circumferential direction. Therefore, according to at least an embodiment of the present invention, in a stator core which is structured so that a belt-shaped core formed of a plurality of outer peripheral parts connected with each other through connecting parts is successively bent at positions of the connecting parts and finally a joint is formed, when the first outer peripheral parts are to be finally bent, the recessed parts are formed between the salient pole parts connected with the first outer peripheral parts and the joint in the circumferential direction and thus the first outer peripheral parts can be pressed at further near positions to the joint (in other words, far position from the connecting part). As a result, when viewed in an axial direction of the stator, the first outer peripheral parts can be bent so that the tip end faces of the salient pole parts connected with the first outer peripheral parts are approached to the imaginary circle "VC10". Therefore, according to at least an embodiment of the present invention, in a stator including a stator core, which is a curling core, deterioration of circularity of a circle which is formed by the tip end faces of a plurality of salient pole parts when viewed in an axial direction of the stator can be restrained even when the number of the salient pole parts of the stator core is relatively small. In this case, specifically, the stator core is a laminated core which is structured by laminating thin magnetic plates made of magnetic material, and the recessed part is formed over an entire region of the first outer peripheral part in a laminated direction of the laminated core.

In at least an embodiment of the present invention, it is preferable that the recessed part is formed at a substantially center position in the circumferential direction between the salient pole part connected with the first outer peripheral part and the joint, and the recessed part is formed as an engaging part which is capable of being pressed toward the inner side in the radial direction. According to this structure, a distance between the joint and the recessed part in a circumferential direction can be secured. Therefore, for example, in a case that end parts in the circumferential direction of the first outer peripheral parts are welded to form a joint, the end parts in the circumferential direction of the first outer peripheral parts can be welded in a state that the recessed parts of the first outer peripheral parts are pressed by a predetermined bending jig. Accordingly, when viewed in the axial direction of the stator, the first outer peripheral parts can be bent so that the tip end faces of the salient pole parts connected with the first outer peripheral parts are approached to the imaginary circle "VC10" and, for example, in a state that the recessed parts are pressed by a bending jig, the end parts in the circumferential direction of the first outer peripheral parts can be welded.

In at least an embodiment of the present invention, for example, an outer side face in the radial direction of the outer peripheral part is formed with a second recessed part which is recessed toward an inner side in the radial direction, and the second recessed part is formed at a center position in the circumferential direction of the outer peripheral part as an engaging part which is capable of being pressed toward an inner side in the radial direction. In this case, when a belt-shaped core structured of a plurality of the outer peripheral parts connected with each other through the connecting parts are to be successively bent at the positions of the connecting parts, the belt-shaped core can be bent by pressing the second recessed parts in the outer peripheral parts except the first outer peripheral parts.

In at least an embodiment of the present invention, it is preferable that a side face of the recessed part which is formed on an outer side face in the radial direction of the first outer peripheral part is formed as an engaging part which is capable of being pressed toward an inner side in the radial direction, and the side face of the recessed part is provided with two flat faces when viewed in an axial direction of the stator. Further, in at least an embodiment of the present invention, a side face of the recessed part which is formed on an outer side face in the radial direction of the first outer peripheral part is formed in a curved face as an engaging part which is capable of being pressed toward an inner side in the radial direction. According to this structure, disengagement of a bending jig from the recessed part can be prevented when the recessed parts are pressed by the bending jig.

A stator in accordance with at least an embodiment of the present invention is, for example, manufactured in accordance with a manufacturing method for a stator which includes previously preparing an original core body provided with a belt-shaped part in a straight line shape, which is structured of a plurality of outer peripheral parts connected with each other through connecting parts, and a plurality of salient pole parts each of which is protruded from each of the outer peripheral parts in a direction perpendicular to a longitudinal direction of the belt-shaped part, and a bending step in which the original core body is bent at the positions of the connecting parts to structure a stator core. In the manufacturing method, in a case that two outer peripheral parts disposed on both end sides of the belt-shaped part in a straight line shape of the original core body are referred to as first outer peripheral parts, a recessed part is formed so as to be recessed toward an inner side on an outer side face of the first outer peripheral part at a position between the salient pole part connected with the first outer peripheral part and an end part in the longitudinal direction of the belt-shaped part in a straight line shape and, when an opposite direction to a protruding direction of the salient pole part with respect to the outer peripheral part is referred to as a first direction, in the bending step, the original core body is successively bent from a center of the belt-shaped part toward both end sides at the positions of the connecting parts by pressing faces on the first direction side of the outer peripheral parts and, when faces on the first direction side of the first outer peripheral parts disposed on the both end sides of the belt-shaped part are to be pressed, the recessed parts are pressed and both end parts in the longitudinal direction of the belt-shaped part are joined as a joint, and thereby the stator core is structured which is provided with an outer peripheral ring part formed in a ring shape and the salient pole parts which are protruded from the outer peripheral ring part toward an inner side in a radial direction of the stator.

In the manufacturing method, in the bending step, when the first outer peripheral parts which are disposed on both end sides of the belt-shaped part and are bent finally are to be bent, the recessed parts are pressed at further near positions to the joint (in other words, far position from the connecting part). As a result, when viewed in an axial direction of the stator, the first outer peripheral parts can be bent so that tip end faces of the salient pole parts connected with the first outer peripheral parts are approached to the imaginary circle "VC10". Therefore, a stator having the stator core which is a curling core is manufactured in accordance with this manufacturing method, deterioration of circularity of a circle which is formed by the tip end faces of a plurality of salient pole parts when viewed in the axial direction of the stator can be restrained even when the number of the salient pole parts of the stator core is relatively small.

In at least an embodiment of the present invention, it may be structured that an outer side face of the outer peripheral part is formed with a second recessed part which is recessed toward an inner side at a center position of the outer peripheral part and, in the bending step, when faces on the first direction side of the outer peripheral parts except the first outer peripheral parts disposed on both end sides of the belt-shaped part are to be pressed, the second recessed parts are pressed to structure the outer peripheral ring part formed in a ring shape structured of the plurality of the outer peripheral parts. In this case, specifically, it is preferable that the belt-shaped part is provided with six outer peripheral parts and, at a first bending time and a second bending time, the original core body is successively bent at the positions of the connecting parts from a center of the belt-shaped part toward both end sides by pressing the second recessed parts formed on the outer peripheral parts and, at a third bending time when the first outer peripheral parts are to be bent, the recessed parts are pressed and both end parts of the first outer peripheral parts are joined to form a joint. According to this method, when viewed in the axial direction of the stator, deterioration of circularity of a circle formed by the tip end faces of six salient pole parts can be restrained.

In at least an embodiment of the present invention, it may be structured that, in a state of the original core body in which the plurality of the salient pole parts are protruded in a direction perpendicular to the longitudinal direction of the belt-shaped part, the insulation member is attached to each of the salient pole parts and the coil is wound around each of the salient pole parts through the insulation member and, after that, the original core body is successively bent from the center of the belt-shaped part toward the both end sides at the positions of the connecting parts by pressing the second recessed parts of the outer peripheral parts and by pressing the recessed parts of the first outer peripheral parts so that the belt-shaped part is formed to be the outer peripheral ring part in a ring shape, and the both end parts of the first outer peripheral parts are welded as the joint and thereby the outer peripheral ring part is completed.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of the present invention will be described below with reference to the accompanying drawings.

(Schematic Structure of Pump Device)

Figure 1:
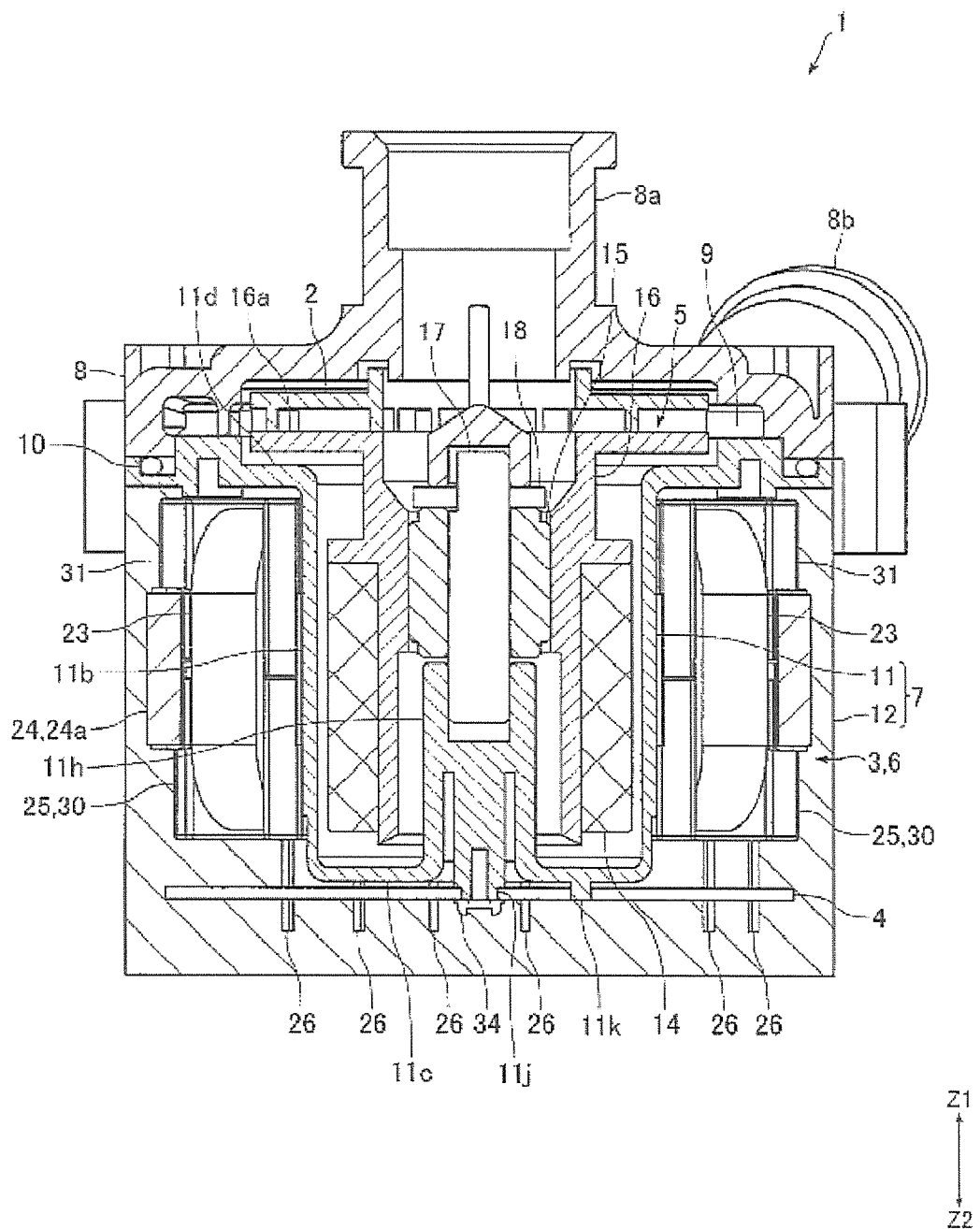
FIG. 1 is a cross-sectional view showing a pump device on which a stator in accordance with an embodiment of the present invention is mounted.

FIG. 1 is a cross-sectional view showing a pump device 1 on which a stator 6 in accordance with an embodiment of the present invention is mounted. In the following descriptions, an upper side in FIG. 1 ("Z1" direction side) is referred to as an "upper" side, and a lower side in FIG. 1 ("Z2" direction side) is referred to as a "lower" side.

A pump device 1 in this embodiment is a pump referred to as a canned pump (canned motor pump), which includes an impeller 2, a motor 3 structured to rotate the impeller 2, and a circuit board 4 configured to control the motor 3. The motor 3 is structured of a rotor 5 and a stator 6. The impeller 2, the motor 3 and the circuit board 4 are disposed inside a case body structured of a housing 7 and an upper case 8 which covers an upper part of the housing 7. The housing 7 and the upper case 8 are fixed to each other with a screw not shown.

The upper case 8 is formed with an intake part 8a for fluid and an ejection part 8b for fluid. A pump chamber 9 where fluid inhaled through the intake part 8a is passed toward the ejection part 8b is formed between the housing 7 and the upper case 8. Further, a sealing member (O-ring) 10 is disposed at a joined portion between the housing 7 and the upper case 8 for securing airtightness of the pump chamber 9. The housing 7 includes a partition member 11 which is disposed between the pump chamber 9 and the stator 6 so as to separate the pump chamber 9 from the stator 6, and a resin sealing member 12 made of resin which covers an under face and a side face of the partition member 11.

The rotor 5 includes a drive magnet 14, a sleeve 15 in a cylindrical tube shape, and a holding member 16 which holds the drive magnet 14 and the sleeve 15. The holding member 16 is formed in a substantially cylindrical tube shape with a flange. The drive magnet 14 is fixed on an outer peripheral side of the holding member 16 and the sleeve 15 is fixed on an inner peripheral side of the holding member 16. An impeller 2 is fixed to a flange part 16a disposed on an upper side of the holding member 16. The impeller 2 and the rotor 5 are disposed inside the pump chamber 9.

The rotor 5 is rotatably supported by a fixed shaft 17. The fixed shaft 17 is disposed so that an axial direction of the fixed shaft 17 and the upper and lower direction are coincided with each other. In other words, the upper and lower direction is an axial direction of the rotor 5. An upper end of the fixed shaft 17 is held by the upper case 8 and a lower end of the fixed shaft 17 is held by the housing 7. The fixed shaft 17 is inserted through an inner peripheral side of the sleeve 15. Further, the fixed shaft 17 is attached with a thrust bearing member 18 which is abutted with an upper end face of the sleeve 15. In this embodiment, the sleeve 15 functions as a radial bearing for the rotor 5, and the sleeve 15 and the thrust bearing member 18 function as a thrust bearing for the rotor 5.

The stator 6 includes drive coils 23 as a coil, a stator core 24, and insulators 25 as an insulation member and is formed in a tube shape as a whole. Specifically, the stator 6 is formed in a substantially cylindrical tube shape. The stator 6 is disposed on an outer peripheral side of the rotor 5 through the partition member 11. In other words, the rotor 5 is disposed on an inner peripheral side of the stator 6. Further, the stator 6 is disposed so that an axial direction of the stator 6 and the upper and lower direction are coincided with each other. In other words, the upper and lower direction is an axial direction of the stator 6. Further, the stator 6 includes terminal pins 26 around which end parts of the drive coil 23 are bound and electrically connected. A specific structure of the stator 6 will be described below. In the following descriptions, a radial direction of the rotor 5 and the stator 6 is referred to as a "radial direction", and a circumferential direction of the rotor 5 and the stator 6 is referred to as a "circumferential direction".

The partition member 11 is formed in a substantially bottomed cylindrical tube shape with a flange and is provided with a cylindrical tube part 11b, a bottom part 11c and a flange part 11d. The cylindrical tube part 11b is formed in a cylindrical tube shape and is disposed so as to cover an outer peripheral face of the drive magnet 14. Further, the cylindrical tube part 11b is disposed so that an axial direction of the cylindrical tube part 11b and the upper and lower direction are substantially coincided with each other. The bottom part 11c is formed in a substantially circular plate shape which closes a lower end of the cylindrical tube part 11b. The flange part 11d is formed so as to be enlarged from an upper end of the cylindrical tube part 11b to an outer side in the radial direction.

An upper face of the bottom part lie is formed with a shaft holding part 11h which holds a lower end side of the fixed shaft 17 so as to be protruded to an upper side. An under face of the bottom part 11c is formed with a fixing projection 11j for fixing a circuit board 4 to the partition member 11 and a positioning projection 11k for positioning the circuit board 4 so as to protrude to a lower side. As shown in FIG. 1, an inner side and an upper side of the partition member 11 is structured to be the pump chamber 9, and the impeller 2 and the rotor 5 are disposed on the inner side and the upper side of the partition member 11. The partition member 11 functions to prevent the fluid inside the pump chamber 9 from flowing into an arrangement portion of the stator 6.

The circuit board 4 is fixed to an under face side of the bottom part 11c so that a thickness direction of the circuit board 4 and the upper and lower direction are coincided with each other. Specifically, the circuit board 4 is fixed to the under face side of the bottom part 11c by a screw 34 screwed into the fixing projection 11j in a state positioned by the fixing projection 11j and the positioning projection 11k. Further, lower end side portions of the terminal pins 26 are fixed to the circuit board 4 by soldering.

The resin sealing member 12 completely covers the circuit board 4, the drive coils 23 and the like to protect the circuit board 4, the drive coils 23 and the like from fluid. The resin sealing member 12 is formed by injecting resin material to the partition member 11 in a state that the circuit board 4 and the stator 6 are attached to the partition member 11. Specifically, the partition member 11 to which the circuit board 4 and the stator 6 have been attached is disposed inside a die and resin material is injected in the die and cured to form the resin sealing member 12. The resin sealing member 12 is formed in a substantially bottomed cylindrical tube shape as a whole and completely covers the circuit board 4, the stator 6, the cylindrical tube part 11b and the bottom part 11c. Further, the resin sealing member 12 covers an under face of the flange part 11d.

(Structure of Stator)

Figure 2:
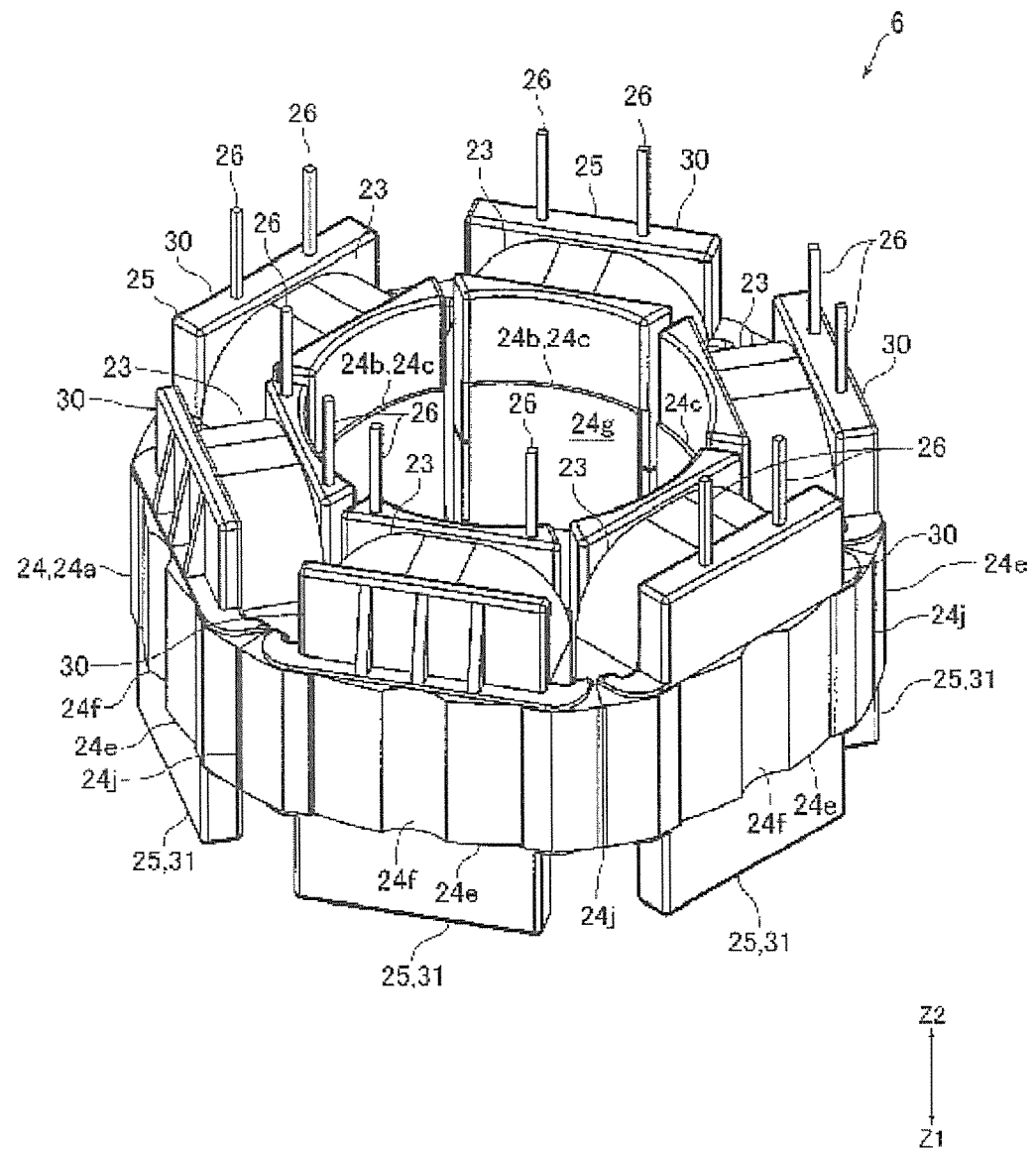
FIG. 2 is a perspective view showing the stator in FIG. 1.
Figure 3:
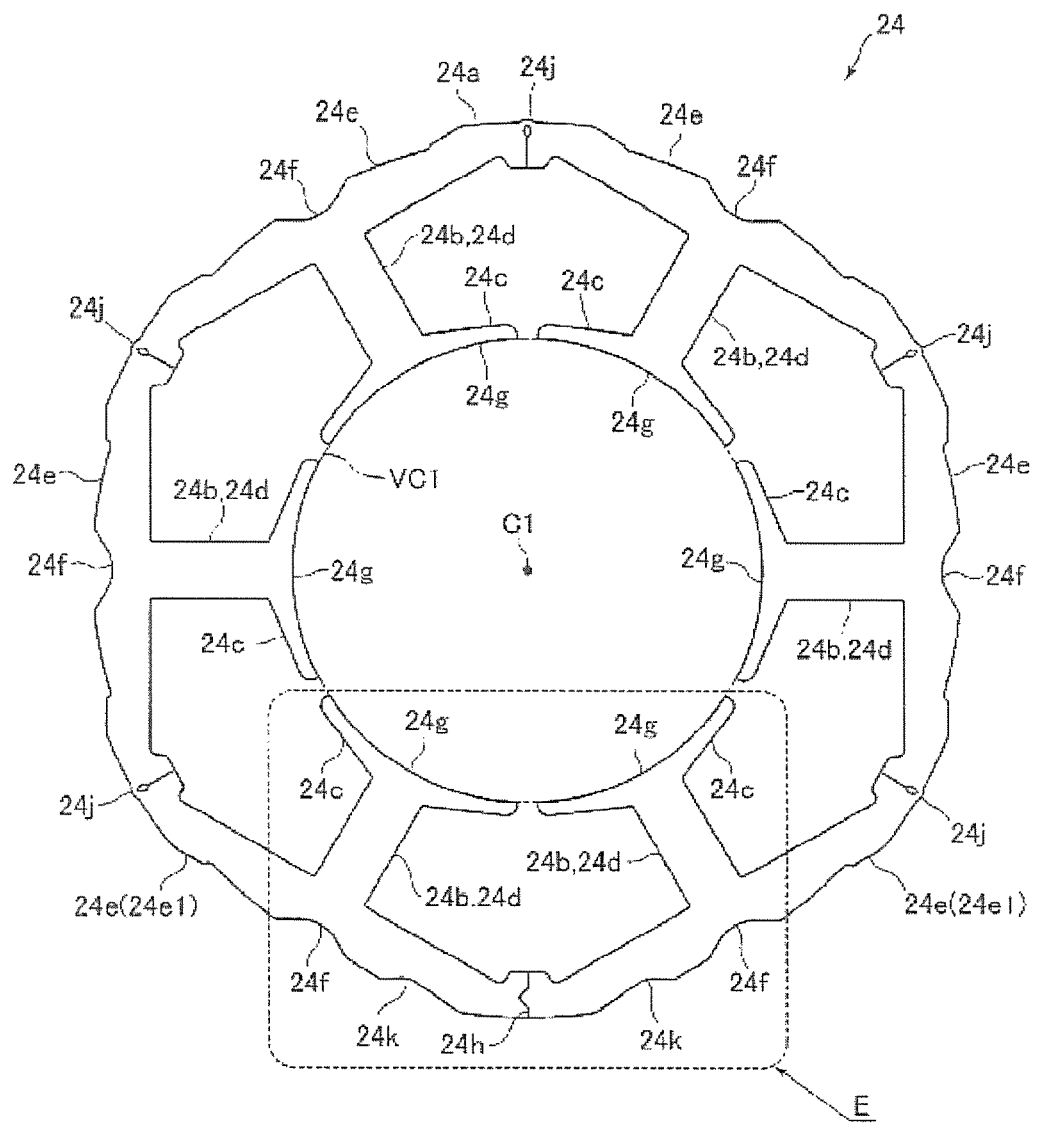
FIG. 3 is a plan view showing a stator core which is used in the stator shown in FIG. 2.
Figure 4:
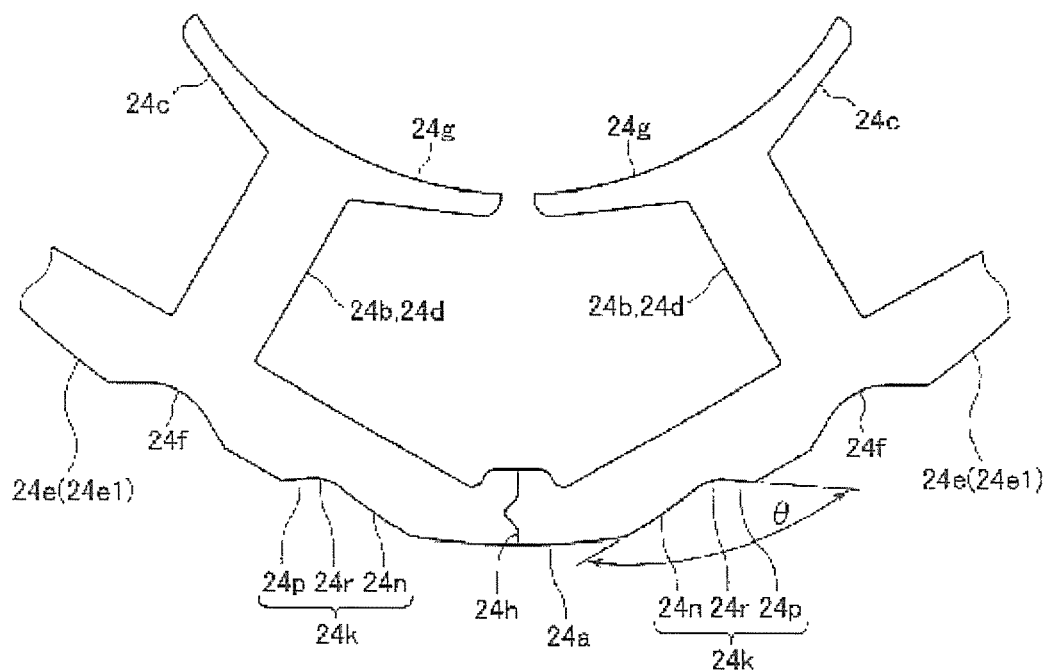
FIG. 4 is an enlarged view showing the "E" part in FIG. 3.

FIG. 2 is a perspective view showing the stator 6 in FIG. 1. FIG. 3 is a plan view showing a stator core 24 which is used in the stator 6 shown in FIG. 2. FIG. 4 is an enlarged view showing the "E" part in FIG. 3.

The stator 6 includes, as described above, the drive coils 23, an stator core 24, the insulators 25 and the terminal pins 26. The stator core 24 is a laminated core which is structured by laminating thin magnetic plates made of magnetic material. The stator core 24 is, as shown in FIG. 3, provided with an outer peripheral ring part 24a formed in a ring shape and a plurality of salient pole parts 24b which are protruded toward an inner side in the radial direction from the outer peripheral ring part 24a. The stator core 24 in this embodiment is provided with six salient pole parts 24b. Six salient pole parts 24b are formed at equal angular pitches and are disposed at constant intervals in the circumferential direction. In accordance with an embodiment of the present invention, the number of the salient pole parts 24b of the stator core 24 may be the number other than six.

A shape of an outer peripheral face of the outer peripheral ring part 24a is a substantially circular shape when viewed in the upper and lower direction, and a shape of its inner peripheral face when viewed in the upper and lower direction is formed in a substantially hexagonal ring shape. The outer peripheral face of the outer peripheral ring part 24a structures an outer peripheral face of the stator core 24. An axial center of the outer peripheral ring part 24a when viewed in the upper and lower direction is an axial center of the stator core 24. Further, the axial center of the stator core 24 when viewed in the upper and lower direction is coincided with the axial center "C1" of the stator 6.

The outer peripheral ring part 24a is structured of six outer peripheral parts 24e which are arranged in the circumferential direction. In other words, the outer peripheral ring part 24a is structured of the outer peripheral parts 24e having the same number as that of the salient pole parts 24b. One outer peripheral part 24e is one portion of the outer peripheral ring part 24a in the circumferential direction, which is a portion between one vertex and its adjacent vertex of the inner peripheral face of the outer peripheral ring part 24a which is formed in a substantially hexagonal shape when viewed in the upper and lower direction. In other words, one outer peripheral part 24*e* is one portion of the outer peripheral ring part 24*a* in the circumferential direction, which is a portion corresponding to one side of the inner peripheral face in a substantially hexagonal shape of the outer peripheral ring part 24*a* when viewed in the upper and lower direction.

An outer side face (outer peripheral face) of the outer peripheral part 24*e* in the radial direction is formed in a convex curved surface shape whose shape when viewed in the upper and lower direction is formed in a substantially circular arc shape. An inner side face of the outer peripheral part 24*e* in the radial direction is formed in a flat face shape whose shape when viewed in the upper and lower direction is a straight line shape. The outer peripheral face of the outer peripheral part 24*e* is formed with a recessed part 24*f* as a second recessed part which is recessed toward an inner side in the radial direction and serves as an engaging part so that the outer peripheral part 24*e* is capable of being pressed toward the inner side in the radial direction. The recessed part 24*f* is formed over the entire region of the outer peripheral part 24*e* in the upper and lower direction (in other words, a laminated direction of the laminated cores). Further, the recessed part 24*f* is formed at a center position of the outer peripheral part 24*e* in the circumferential direction (in other words, a center position of the outer peripheral face of the outer peripheral part 24*e* in the circumferential direction). In addition, a side face of the recessed part 24*f* formed on an outer side face in the radial direction of the outer peripheral part 24*e* is formed in a substantially circular arc shape when viewed in the upper and lower direction.

The salient pole part 24*b* is formed at a center of the outer peripheral part 24*e* in the circumferential direction. In other words, one salient pole part 24*b* is connected with a center in the circumferential direction of each of six outer peripheral parts 24*e*. Further, the salient pole part 24*b* is structured of a salient pole tip end part 24*c* which is a tip end part of the salient pole part 24*b* and a connecting part 24*d* which connects the salient pole tip end part 24*c* with the outer peripheral ring part 24*a*. The connecting part 24*d* is formed in a straight line shape perpendicular to the inner side face in the radial direction of the outer peripheral part 24*e*. The salient pole tip end part 24*c* is formed in a substantially circular arc shape which is extended to both sides in the circumferential direction from a tip end (inner side end in the radial direction) of the connecting part 24*d* which is formed in a straight line shape when viewed in the upper and lower direction.

A tip end face 24*g* of the salient pole part 24*b* (in other words, an inner side face in the radial direction of the salient pole tip end part 24*c*) is formed in a curved face whose shape when viewed in the upper and lower direction is a circular arc shape. The tip end faces 24*g* of six salient pole parts 24*b* are disposed in a design on an imaginary circle "VC1" (see FIG. 3) with the axial center "C1" of the stator 6 as a center when viewed in the upper and lower direction. Further, the six tip end faces 24*g* are faced with an outer peripheral face of the drive magnet 14 through the cylindrical tube part 11*b*.

The stator core 24 is a curling core which is structured so that six outer peripheral parts 24*e* connected with each other in a straight line shape (see FIG. 5) are bent at boundaries between the outer peripheral parts 24*e* and the end parts are joined with each other. In other words, the stator core 24 is formed in a ring shape by joining both end parts of the original core body with each other which is structured of a belt-shaped core which becomes the outer peripheral ring part 24*a* and six salient pole parts 24*b* extended from one side face of the belt-shaped core. Therefore, as shown in FIG. 3, a joint 24*h* is formed at one boundary among the boundaries of six outer peripheral parts 24*e* in the circumferential direction. In this embodiment, the end parts of the belt-shaped core are welded and fixed to each other at the joint 24*h*, and a welding mark is left at the joint 24*h*.

Further, except the one boundary formed with the joint 24*h* among six boundaries of the outer peripheral parts 24*e* in the circumferential direction, a connecting part 24*j* which connects outer side ends in the radial direction of the outer peripheral parts 24*e* is formed at five remaining boundaries of the outer peripheral parts 24*e*. In the following descriptions, when two outer peripheral parts 24*e* disposed on both sides of the joint 24*h* are distinguishably expressed from four remaining outer peripheral parts 24*e*, these two outer peripheral parts 24*e* are shown as "outer peripheral part 24*e*1". The outer peripheral parts 24*e*1 in this embodiment are first outer peripheral parts.

An outer side face in the radial direction of the outer peripheral part 24*e*1 is formed, in addition to the recessed part 24*f*, with a recessed part 24*k* which is recessed toward an inner side in the radial direction and serves as an engaging part through which the outer peripheral part 24*e*1 is capable of being pressed toward the inner side in the radial direction. The recessed part 24*k* is formed over the entire region in the upper and lower direction (in other words, a laminated direction of the laminated cores) of the outer peripheral part 24*e*1. Further, the recessed part 24*k* is formed between the salient pole part 24*b* connected with the outer peripheral part 24*e*1 and the joint 24*h* in the circumferential direction. Specifically, the recessed part 24*k* is formed at a substantially center position between the salient pole part 24*b* connected with the outer peripheral part 24*e*1 and the joint 24*h* in the circumferential direction. Further, the recessed part 24*k* is formed between the recessed part 24*f* of the outer peripheral part 24*e*1 and the joint 24*h*.

In addition, a side face of the recessed part 24*k* which is formed on an outer side face in the radial direction of the outer peripheral part 24*e*1 is, as shown in FIG. 4, structured of two flat faces 24*n* and 24*p* whose shape when viewed in the upper and lower direction is a straight line and a curved face 24*r* which smoothly connects the flat face 24*n* with the flat face 24*p*. When viewed in the upper and lower direction, an angle "θ" (see FIG. 4) formed by the flat face 24*n* and the flat face 24*p* is set to be about 140°. The curved face 24*r* smoothly connects an inner side end in the radial direction of the flat face 24*n* with an inner side end in the radial direction of the flat face 24*p*. Further, the flat face 24*n* is disposed on the joint 24*h* side and the flat face 24*p* is disposed on the salient pole part 24*b* side in the circumferential direction. An inclination angle of the flat face 24*n* with respect to the outer side face in the radial direction of the outer peripheral part 24*e*1 is set to be more gradual than an inclination angle of the flat face 24*p*. In other words, when viewed in the upper and lower direction, the flat face 24*n* and the flat face 24*p* are asymmetrical each other.

The insulator 25 is formed of insulating material such as resin. The insulator 25 is attached to each of the salient pole parts 24*b* and the stator 6 includes six insulators 25. Further, the insulator 25 is formed in a tube shape with flanges having a flange part at both ends and is attached to the salient pole part 24*b* so that an axial direction of the insulator 25 and the radial direction of the stator 6 are coincided with each other. The insulator 25 is structured of a first insulator 30 and a second insulator 31 which can be divided in the upper and lower direction. The insulator 25 is formed by combining the first insulator 30 disposed on a lower side with the second insulator 31 disposed on an upper side.

An upper end side portion of the terminal pin 26 is press-fitted and fixed to the first insulator 30 and a lower end side portion of the terminal pin 26 is protruded from the first insulator 30 to a lower side. The drive coil 23 is structured of a conducting wire made of aluminum alloy or copper alloy. The drive coil 23 is wound around the salient pole part 24b through the insulator 25. One end part of the drive coil 23 is bound around and fixed to one of two terminal pins fixed to the first insulator 30 and the other end part of the drive coil 23 is bound around and fixed to the other of two terminal pins 26.

(Manufacturing Method for Stator)

Figure 5:
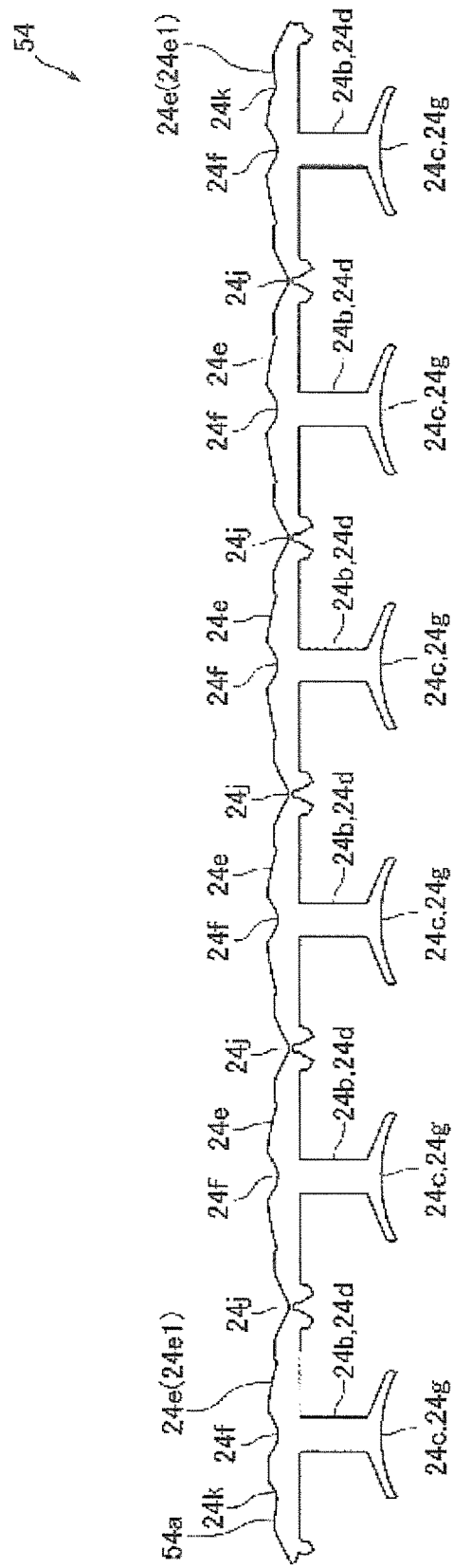
FIG. 5 is a plan view showing an original core body which becomes the stator core shown in FIG. 3 after bending processing is performed.
Figure 6A:
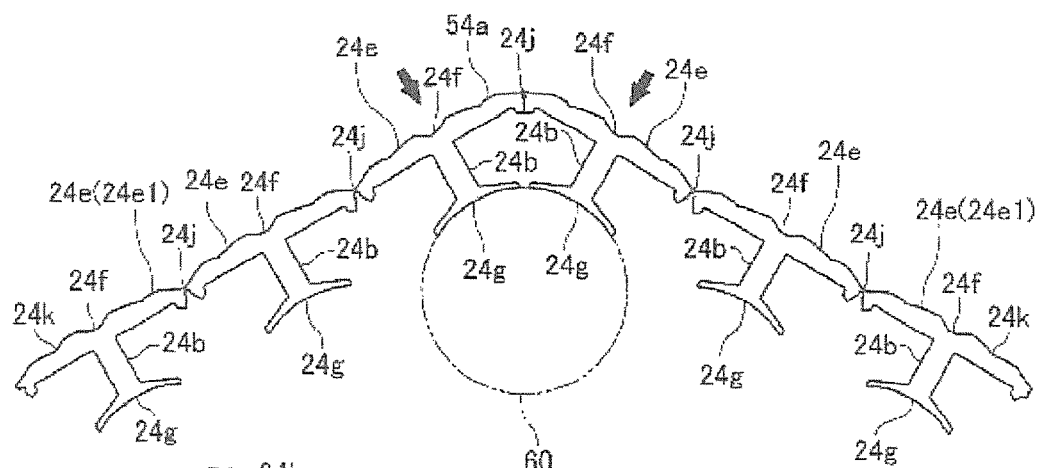
FIGS. 6A, 6B and 6C are explanatory views showing a forming method for the stator core in FIG. 3.
Figure 6B:
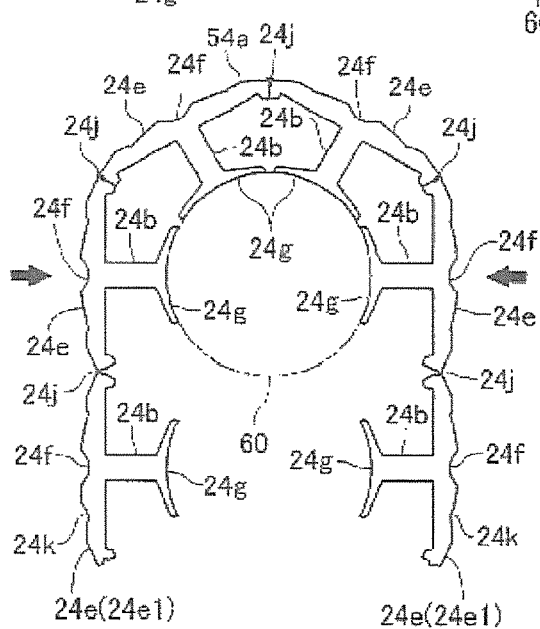
Figure 6C:
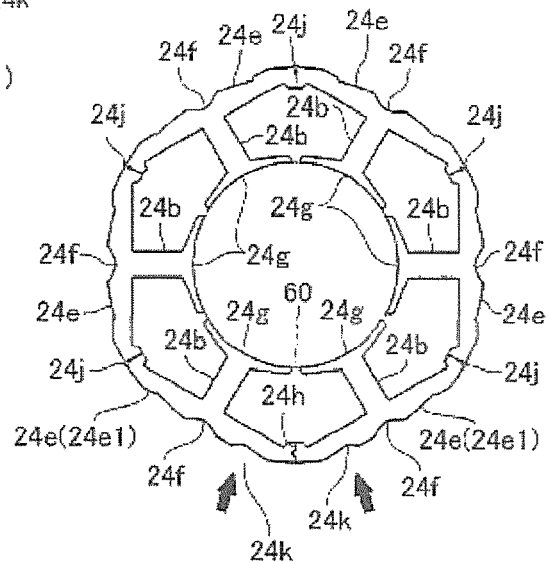
Figure 7:
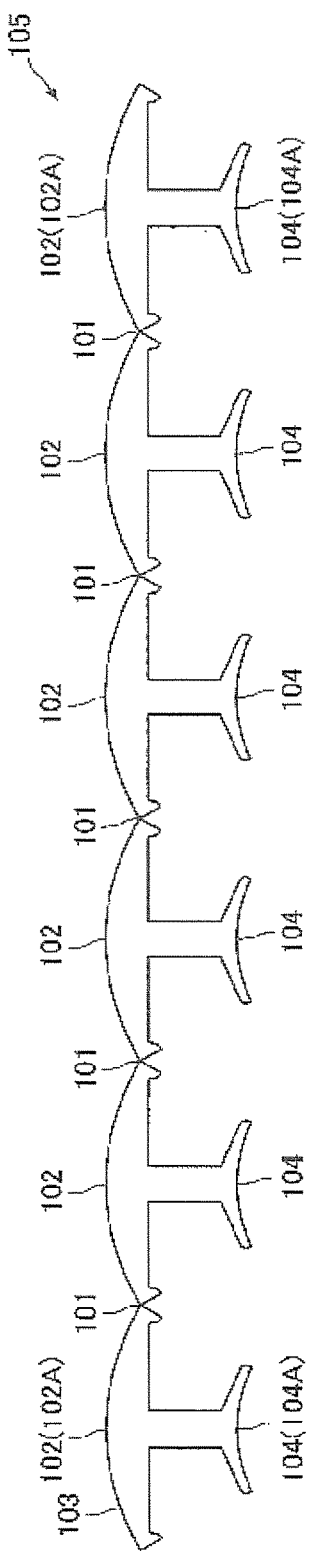
FIG. 7 is a view for explaining a conventional stator core.
Figure 8A:
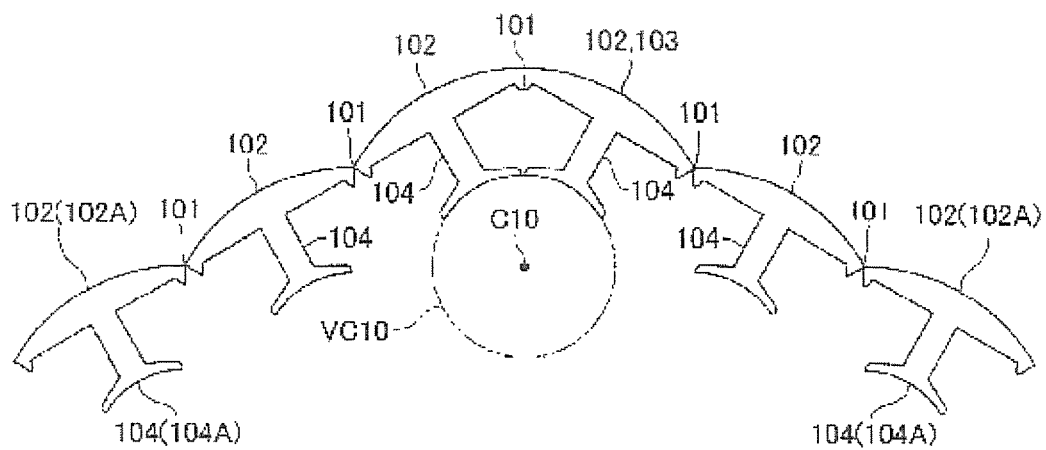
FIGS. 8A, 8B and 8C are views for explaining a problem in the conventional stator core.
Figure 8B:
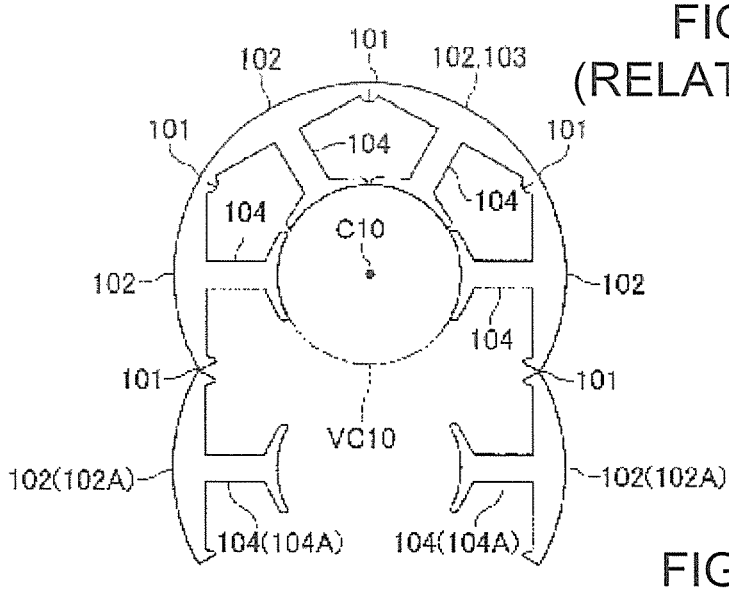
Figure 8C:
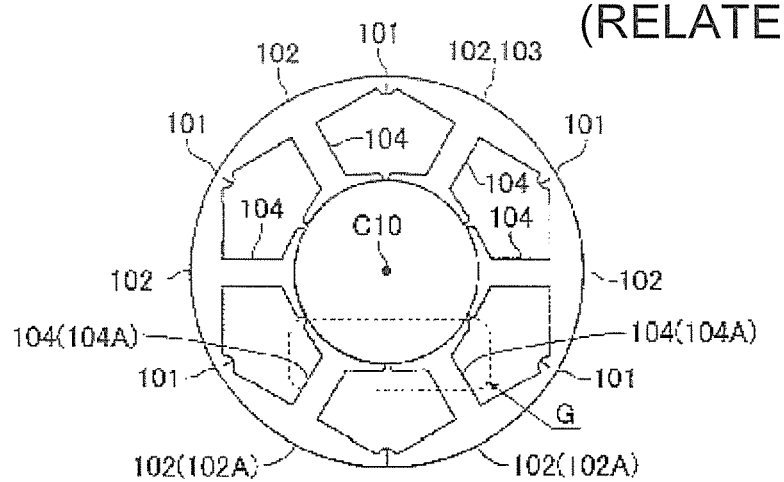
Figure 9:
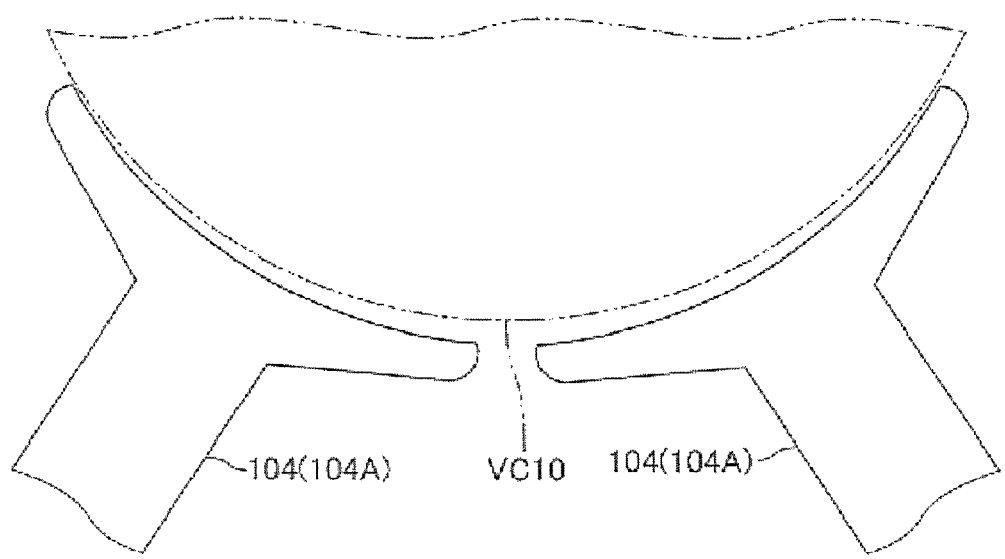
FIG. 9 is an enlarged view showing the "G" part in FIG. 8C.

FIG. 5 is a plan view showing an original core body 54 which becomes the stator core 24 shown in FIG. 3 after bending processing is performed. FIGS. 6A, 6B and 6C are explanatory views showing a forming method for the stator core 24 in FIG. 3.

The stator 6 is manufactured as described below. First, the insulators 25 are attached to an original core body 54 (see FIG. 5) which becomes the stator core 24 after bending processing is performed. The original core body 54 is, as shown in FIG. 5, provided with a belt-shaped part 54a in a straight line shape, which is structured of six outer peripheral parts 24e connected with each other through connecting parts 24j, and six salient pole parts 24b which are protruded from each of six outer peripheral parts 24e in a direction perpendicular to a longitudinal direction of the belt-shaped part 54a. In the original core body 54, recessed parts 24f are formed in the outer peripheral parts 24e. Further, two outer peripheral parts 24e which are disposed on both ends of the original core body 54 are outer peripheral parts 24e1 and each of the outer peripheral parts 24e1 is formed with a recessed part 24k.

After that, terminal pins 26 are press-fitted and fixed to the insulators 25, drive coils 23 are wound around the salient pole parts 24b through the insulators 25, and the drive coils 23 are fixed to the terminal pins 26 by soldering.

After that, the original core body 54 is successively bent at positions of the connecting parts 24j so that the belt-shaped part 54a in a straight line shape becomes an outer peripheral ring part 24a formed in a ring shape, and so that the salient pole parts 24b are protruded to an inner side in a radial direction of the outer peripheral ring part 24a (bending step). Specifically, in the order shown in FIGS. 6A through 6C, the belt-shaped part 54a is bent three times from the center of the belt-shaped part 54a toward both end sides. Further, when an opposite direction to a protruding direction of the salient pole part 24b with respect to the outer peripheral part 24e is referred to as a first direction, in the bending step, the original core body 54 is bent at the connecting part 24j by pressing a face on the first direction side of the outer peripheral part 24e.

Specifically, in the bending step, when the belt-shaped part 54a is to be bent first (at a first bending time), a jig for bending (bending jig, not shown) is abutted with the recessed parts 24f and presses the recessed parts 24f from directions shown by the arrows in FIG. 6A and, in this manner, the belt-shaped part 54a is bent by the bending jig. Next, when the belt-shaped part 54a is to be bent secondly (at a second bending time), the bending jig is abutted with the recessed parts 24f and presses the recessed parts 24f from directions shown by the arrows in FIG. 6B and, in this manner, the belt-shaped part 54a is bent secondly by the bending jig. In this embodiment, in the bending step, a jig 60 in a columnar shape with which the tip end faces 24g of the salient pole parts 24b are abutted is used.

Further, in the bending step, when the belt-shaped part 54a is to be bent thirdly (at a third bending time), the bending jig is abutted with the recessed parts 24k and presses the recessed parts 24k from directions shown by the arrows in FIG. 6C and thereby the belt-shaped part 54a is bent thirdly by the bending jig. In other words, in the bending step, the recessed parts 24k are pressed when the faces on the first direction side of the outer peripheral parts 24e1 disposed on both end sides of the belt-shaped part 54a are pressed. Further, the recessed parts 24f are pressed when the faces on the first direction side of the outer peripheral part 24e other than the outer peripheral parts 24e1 are pressed. In FIGS. 6A, 6B and 6C, the drive coils 23, the insulators 25 and the terminal pins 26 are not shown.

After that, the end parts of the belt-shaped part 54a are joined with each other by welding to form a joint 24h. For example, the end parts of the belt-shaped part 54a are joined with each other by laser welding to form a joint 24h. When the end parts of the belt-shaped part 54a are joined, the stator 6 is completed. When the stator 6 is completed, the cylindrical tube part 11b of the partition member 11 is inserted on an inner peripheral side of the stator 6. After that, the circuit board 4 is fixed to the partition member 11 and the terminal pins 26 are soldered and fixed to the circuit board 4. After that, the resin sealing member 12 is formed so as to cover the stator 6 and the circuit board 4.

(Principal Effects in this Embodiment)

As described above, in this embodiment, the recessed part 24k is formed on two outer peripheral parts 24e1 disposed on both sides of the joint 24h. The recessed part 24k is formed between the salient pole part 24b connected with the outer peripheral part 24e1 and the joint 24h in the circumferential direction. Further, in this embodiment, in the bending step for manufacturing the stator 6, the recessed part 24k is pressed when the face on the first direction side of the outer peripheral part 24e1 is pressed. In other words, in this embodiment, when the outer peripheral parts 24e1 are to be bent last in the bending step, the recessed parts 24k are pressed which are formed at positions near to the joint 24h (in other words, far positions from the connecting parts 24j).

Therefore, in this embodiment, in a stator core 24 which is manufactured so that a belt-shaped part 54a structured of six outer peripheral parts 24e connected with each other through connecting parts 24j are successively bent at connecting parts 24j as shown in FIGS. 6A through 6C to form a joint 24h, even in a case that the number of the salient pole parts 24b is relatively small, when viewed in the upper and lower direction, the tip end faces 24g of the salient pole parts 24b connected with the outer peripheral parts 24e1 can be brought close to the imaginary circle "VC1" (see FIG. 3). Therefore, in this embodiment, even in a case that the number of the salient pole parts 24b of the stator core 24 which is a curling core is relatively small, when viewed in the upper and lower direction, deterioration of circularity of a circle formed by six tip end faces 24g can be restrained.

In this embodiment, the recessed part 24k is formed at a substantially center position in the circumferential direction between the salient pole part 24b connected with the outer peripheral part 24e1 and the joint 24h. Therefore, in this embodiment, a distance in the circumferential direction between the joint 24h and the recessed part 24k can be secured. Accordingly, in this embodiment, for example, in a case that end parts in the circumferential direction of the outer peripheral parts 24e1 are connected with each other by laser welding to form the joint 24h, a laser can be irradiated to the end parts in the circumferential direction of the outer peripheral parts 24e1 in a state that the recessed parts 24k of the outer peripheral parts 24e1 are pressed by a bending jig. Therefore, according to this embodiment, when viewed in the upper and lower direction, the tip end faces 24g of the salient pole parts 24b connected with the outer peripheral parts 24e1 can be brought close to the imaginary circle "VC1". In addition, for example, a laser is irradiated to the end parts in the circumferential direction of the outer peripheral parts 24e1 in a state that the recessed parts 24k are pressed by a bending jig and thereby the end parts in the circumferential direction of the outer peripheral parts 24e1 are welded.

In this embodiment, the side face of the recessed part 24k is structured of two flat faces 24n and 24p and a curved face 24r which smoothly connects the flat face 24n with the flat face 24p. Therefore, according to this embodiment, in the bending step, disengagement of the bending jig from the recessed part 24k is prevented when the recessed part 24k is pressed by the bending jig.

(Other Embodiments)

Although the present invention has been shown and described with reference to a specific embodiment, various changes and modifications will be apparent to those skilled in the art from the teachings herein.

In the embodiment described above, the recessed part 24k is formed at a substantially center position in a circumferential direction between the salient pole part 24b connected with the outer peripheral part 24e1 and the joint 24h. However, the present invention is not limited to this embodiment. For example, the recessed part 24k may be formed in a circumferential direction on the joint 24h side or on the salient pole part 24b side connected with the outer peripheral part 24e1 with respect to a substantially center position between the salient pole part 24b connected with the outer peripheral part 24e1 and the joint 24h. Further, in the embodiment described above, the side face of the recessed part 24k is formed of two flat faces 24n and 24p and the curved face 24r. However, the entire side face of the recessed part 24k may be formed of a curved face.

In the embodiment described above, the recessed part 24f is formed on the outer peripheral part 24e1 but no recessed part 24f may be formed on the outer peripheral part 24e1. Further, in the embodiment described above, no recessed part 24f may be formed on six outer peripheral parts 24e including the outer peripheral parts 24e1. Further, in the embodiment described above, the stator core 24 is a laminated core. However, in a case that the stator core 24 is a curling core, the stator core 24 may be structured of a core other than a laminated core. Further, in the embodiment described above, the motor 3 is used in a pump device 1 but the motor 3 may be used in a device other than a pump device 1. Further, in the embodiment described above, the stator 6 is used in a motor 3. However, the stator 6 may be used in an electric power generator.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A stator, comprising:

a coil;

an insulation member; and a stator core provided with a plurality of salient pole parts around each of which the coil is wound through the insulation member;

wherein the stator core is provided with an outer peripheral ring part formed in a ring shape and the plurality of the salient pole parts which are protruded from the outer peripheral ring part toward an inner side in a radial direction of the stator and are disposed at a constant interval in a circumferential direction of the stator;

wherein the outer peripheral ring part is structured of outer peripheral parts having the same number as that of the plurality of the salient pole parts;

wherein the outer peripheral parts are arranged in the circumferential direction and a center in the circumferential direction of each of the outer peripheral parts is connected with the salient pole part;

wherein a joint is formed at one position of boundaries in the circumferential direction of the outer peripheral parts;

wherein remaining positions of the boundaries in the circumferential direction of the outer peripheral parts except the joint are formed with connecting parts which connect outer side ends in the radial direction of the outer peripheral parts with each other;

wherein when the outer peripheral parts disposed on both sides of the joint are referred to as first outer peripheral parts, an outer side face in the radial direction of the first outer peripheral part is formed with a recessed part which is recessed toward an inner side in the radial direction; and wherein the recessed part is formed between the salient pole part connected with the first outer peripheral part and the joint in the circumferential direction;

wherein an outer side face in the radial direction at least of the outer peripheral part except the first outer peripheral part is formed with a second recessed part which is recessed toward an inner side in the radial direction;

wherein the second recessed part is formed at a center position in the circumferential direction of the outer peripheral part as an engaging part which is capable of being pressed toward the inner side in the radial direction; and wherein a side face of the recessed part which is formed on an outer side in the radial direction of the first outer peripheral part is formed in a curved face as an engaging part which is capable of being pressed toward an inner side in the radial direction.

2. The stator according to claim 1, wherein the recessed part is formed at a substantially center position in the circumferential direction between the salient pole part connected with the first outer peripheral part and the joint, and the recessed part is formed as an engaging part which is capable of being pressed toward the inner side in the radial direction.

3. The stator according to claim 1, wherein the side face of the recessed part which is formed on an outer side in the radial direction of the first outer peripheral part is formed as the engaging part which is capable of being pressed toward an inner side in the radial direction, and the side face of the recessed part is further provided with two flat faces when viewed in an axial direction of the stator.

4. The stator according to claim 1, wherein
the stator core is a laminated core which is structured by laminating thin magnetic plates made of magnetic material, and
the recessed part is formed over an entire region of the first outer peripheral part in a laminated direction of the laminated core.

5. A manufacturing method for a stator, the stator comprising a coil, an insulation member, and a stator core provided with a plurality of salient pole parts around each of which the coil is wound through the insulation member, the manufacturing method comprising:
previously preparing an original core body provided with a belt-shaped part in a straight line shape, which is structured of a plurality of outer peripheral parts connected with each other through connecting parts, and a plurality of salient pole parts each of which is protruded from each of the outer peripheral parts in a direction perpendicular to a longitudinal direction of the belt-shaped part;
in a case that two outer peripheral parts disposed on both end sides of the belt-shaped part in the straight line shape of the original core body are referred to as first outer peripheral parts, previously forming a recessed part which is recessed toward an inner side on an outer side face of the first outer peripheral part at a position between the salient pole part connected with the first outer peripheral part and an end part in the longitudinal direction of the belt-shaped part in the straight line shape;
wherein an outer side face at least of the outer peripheral part except the first outer peripheral part disposed on both end sides of the belt-shaped part is formed with a second recessed part which is recessed toward an inner side at a center position of the outer peripheral part;
wherein a side face of the recessed part which is formed on an outer side in the radial direction of the first outer peripheral part is formed in a curved face as an engaging part which is capable of being pressed toward an inner side in the radial direction, and
a bending step in which the original core body is bent at positions of the connecting parts;
wherein when an opposite direction to a protruding direction of the salient pole part with respect to the outer peripheral part is referred to as a first direction, in the bending step, the original core body is successively bent from a center of the belt-shaped part toward both end sides at the positions of the connecting parts by pressing the second recessed parts on a side of the first direction of the outer peripheral parts except the first outer peripheral parts, and wherein when faces on the side of the first direction of the first outer peripheral parts disposed on the both end sides of the belt-shaped part are to be pressed, the recessed parts are pressed and both end parts in the longitudinal direction of the belt-shaped part are joined as a joint, and thereby the stator core is structured which is provided with an outer peripheral ring part formed in a ring shape and the salient pole parts which are protruded from the outer peripheral ring part toward an inner side in a radial direction of the stator.

6. The manufacturing method for a stator according to claim 5, wherein
the recessed part is formed at a substantially center position between the salient pole part connected with the first outer peripheral part and the end part in the longitudinal direction of the belt-shaped part in the straight line shape.

7. The manufacturing method for a stator according to claim 5, wherein
the belt-shaped part is provided with six outer peripheral parts,
at a first bending time and a second bending time, the original core body is successively bent at the positions of the connecting parts from a center of the belt-shaped part toward both end sides by pressing the second recessed parts formed on the outer peripheral parts, and
at a third bending time when the first outer peripheral parts are to be bent, the recessed parts are pressed and both end parts of the first outer peripheral parts are joined to form the joint.

8. The manufacturing method for a stator according to claim 5, wherein
in a state of the original core body in which the plurality of the salient pole parts are protruded in a direction perpendicular to the longitudinal direction of the belt-shaped part, the insulation member is attached to each of the salient pole parts and the coil is wound around each of the salient pole parts through the insulation member, and
after that, the original core body is successively bent from the center of the belt-shaped part toward the both end sides at the positions of the connecting parts by pressing second recessed parts of the outer peripheral parts and by pressing the recessed parts of the first outer peripheral parts so that the belt-shaped part is formed to be the outer peripheral ring part in a ring shape, and
after that, the both end parts of the first outer peripheral parts are welded as the joint and thereby the outer peripheral ring part is completed.

9. The manufacturing method for a stator according to claim 5, wherein
the recessed part which is formed on an outer side face of the first outer peripheral part is formed to be a recessed part further having two flat faces.

* * * * *